June 12, 1934.  E. G. PIPER  1,962,461
DIFFERENTIAL DRIVE FOR CENTRIFUGES AND SCRAPERS
Filed April 10, 1933
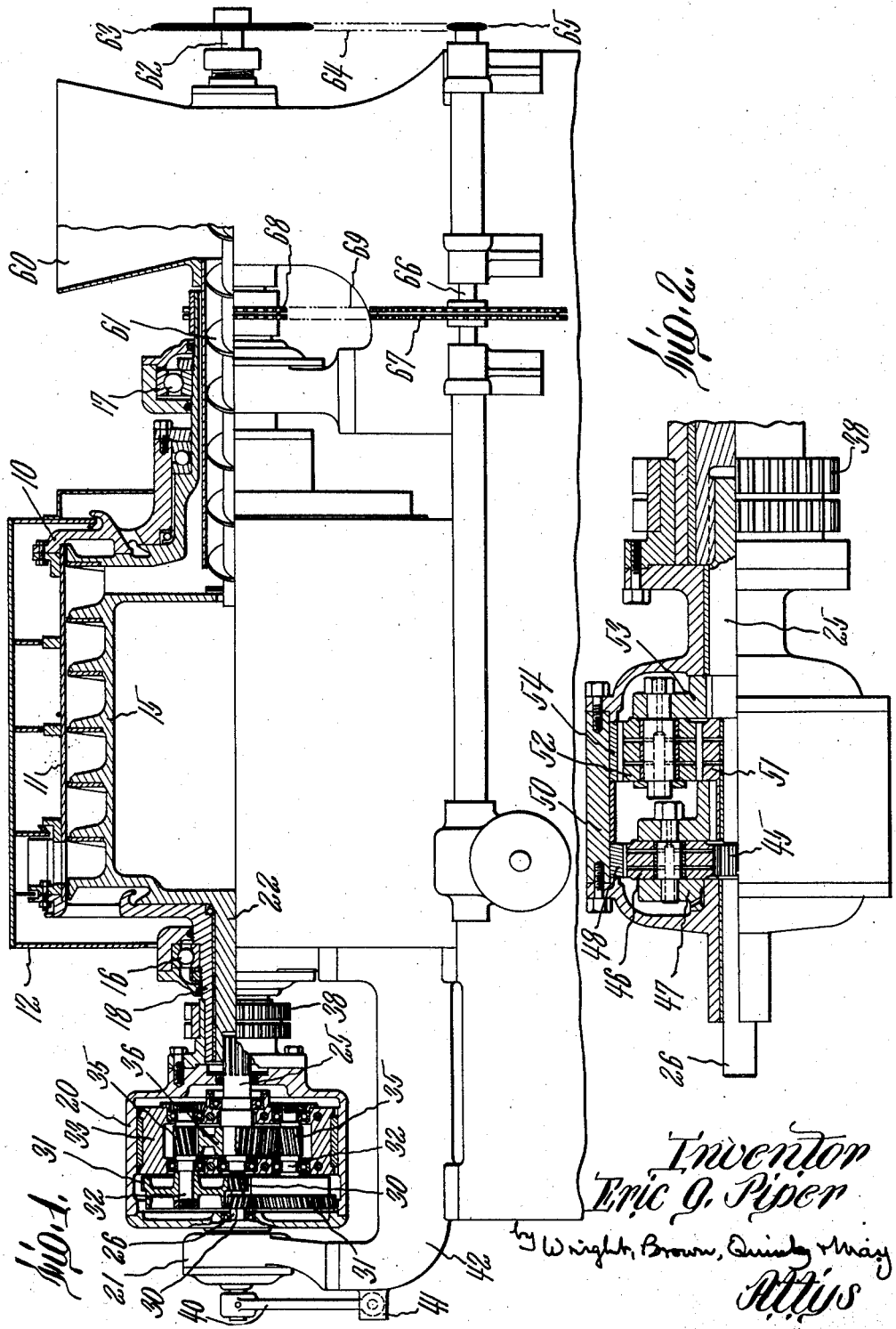
Inventor
Eric G. Piper Patented June 12, 1934

1,962,461

UNITED STATES PATENT OFFICE 1,962,461

DIFFERENTIAL DRIVE FOR CENTRIFUGES AND SCRAPERS

Eric G. Piper, New York, N. Y.

Application April 10, 1933, Serial No. 665,328

3 Claims. (Cl. 74—34)

This invention relates to an improved drive for rotating two members in the same direction but at different speeds of rotation. The invention relates more particularly to apparatus including rotatable members such, for example, as a centrifugal drum and a scraper between which there is normally an absorption of power arising from the difference of rotational speeds and the frictional resistance of the material being treated in the drum. The actual horse-power required to overcome such resistance may be comparatively small, but if the rotational speeds of the members are considerable while their relative speed is small, the drive mechanism is liable to be subjected to the transmission of so-called potential power which may be far in excess of the actual power required to overcome the resistance between the rotating members. The power transmitted by any gear train depends on the torque and rate of tooth engagement. The torque on one member and the equivalent torque reaction on the other member is determined solely by the work done between them at their usually slow relative speeds. It is evident that, should this certain torque be transmitted directly from the power source through two simple trains at the higher actual speeds, then the power transmitted through these trains will be proportionately higher. In such a case, of course, one of the trains will carry the high total driving load and the other will return the reaction load back to the source of power. As the power loss in a well-built gear train is usually of the order of one percent of the total power transmitted, it is evident that in the transmission of large potential power, low over-all efficiency will develop in the gear train. Also, the gearing must be correspondingly massive and cumbersome.

It is an object of the present invention to avoid the transmission of large potential power by driving the differential gearing in such a way that the product of torque and rate of tooth engagement between any two meshing gears in the train will correspond to the actual work done between the two members. According to the invention, this is done by causing the transmission gearing itself to revolve about the in-put shaft, the latter being held stationary. An embodiment of the invention is hereinafter described in detail and is illustrated on the drawing, of which Figure 1 is an elevation of a centrifugal apparatus including a rotatable scraper within a rotatable drum, the scraper and drum being connected by reduction gearing for rotation in the same direction but at different speeds, part of the apparatus being broken away to show in section.

Figure 2 is an elevation, partly in section of another type of reduction gearing which may be used in place of the gearing shown in Figure 1.

Referring to the figures of the drawing in detail, an illustrative embodiment of the invention may include a centrifugal drum 10 including a cylindrical screen 11 through which liquid is intended to be forced by centrifugal action so as to separate such liquid from solids with which it is initially mixed. The drum may be enclosed in a suitable housing 12. An auxiliary member such as a helical scraper 15 is rotatably mounted within the drum. As shown, the drum itself may be mounted in a pair of main bearings 16 and 17 of any suitable construction. Projecting from one end of the drum and extending through the bearing 16 is a hollow shaft 18 which is rigidly coupled to a gear housing 20 so that the housing is rotatable with the drum 10 about a common axis. A suitable main bearing 21 may be provided if desired to support the end of the housing remote from the drum. The auxiliary member 15 within the drum is provided with a shaft 22 nested within the hollow shaft 18 so as to rotate therein on a common axis therewith. The shaft 22 is secured to a coaxial shaft 25 by a keyed or splined coupling so as to rotate therewith on the same axis. The shaft 25, as shown, is at least partially located within the housing 20, another shaft 26 also being partially within the housing but rotatable relatively thereto about the common axis. The shafts 25 and 26 are operatively connected by reduction mechanism of any suitable type so as to rotate about the common axis at different speeds. The shaft 26 may be referred to as the high speed shaft, and the shaft 25 as the low speed shaft, as these shafts are connected, in the embodiment illustrated in Figure 1, by reduction gearing such that if the casing 20 is held stationary and the shaft 26 is rotated, the shaft 25 will rotate at a much lower speed. Such reduction gearing may include a pinion 30 mounted on the shaft 26 to drive one or more gears 31, the latter being mounted on shafts 32 which are journaled in a frame 33 anchored in the casing and virtually forming a part thereof. As shown in Figure 1, the pinion 30 may be of herringbone type and may mesh with two gear wheels 31, these wheels having helical teeth to mesh with a portion of the herringbone teeth so that the gear wheels are self-centering and automatically distribute the load evenly between them. On each shaft 32 is mounted a pinion 35 which meshes with a gear 36, the gear 36 being fixed on the shaft 25. As shown, the pinions 35 and the gear 36 may be provided with helical teeth. It is evident that the gearing illustrated in Figure 1 is a speed reduction gearing such that if the casing 20 be held stationary and the shaft 26 be rotated, the shaft 25 will be driven at a lower speed, since the diameter of the pinion 30 is considerably less than that of the gears 31, and the diameter of the pinions 35 is less than that of the gear 36. Hence, if the drum 10 and the gear casing 20, which is secured thereto, are held stationary and the shaft 26 is rotated at a rate at which the drum 10 is supposed to rotate when in operation, the auxiliary member 15 will be rotated at a much slower rate, this rate being the relative rate of rotation between the auxiliary member 15 and the drum 10. It may be noted that the torque on the pinion 30 and the gears 31 is low compared with that on the pinions 35 and the gears 36. On the other hand, the rate of tooth engagement between the pinion 30 and the gears 31 is considerably higher than the rate of tooth engagement between the pinions 35 and the gear 36, so that the product of torque by rate of tooth engagement in each case is roughly the same and is also substantially equal to the effective power required to overcome the reaction torque of the auxiliary member 15 relative to the drum 10. Where the auxiliary member 15 consists of an agitator, scraper, stirrer, or the like, the frictional resistance depends upon the material acted upon and the relative rates of rotation between the member 15 and the drum 10 in actual operation. Thus in driving the auxiliary member 15 as described, the product of torque by rate of tooth engagement for any pair of meshing gear elements is in no case excessive. Hence power losses in this gear train are small.

In actual operation of the mechanism as a whole, the drum 10 must be rotated at high speed to obtain the desired centrifugal effect on material treated therein. Assuming for the moment that the drum 10 and the housing 20 are held stationary and that the shaft 26 is rotated at a speed equal to the speed at which the drum itself should be rotated in operation, assume further that the housing 20, the drum 10, and their contents are set in rotation as a unit and are brought up to speed such that the rotational velocity is equal and opposite to the rotation of the shaft 26 relative to the housing 20. In such case the rotation of the housing would exactly offset the initial rotation of the shaft so that the resultant absolute rotation of the shaft would be zero. It may be observed that in imparting rotation to the housing 20 and drum 10, together with all the contents thereof, as a unit, the operative relation between the shaft 26, the shaft 25, and the gearing connecting these shafts, remains unchanged, that is, there is no increase in power loss in any pair of meshing gears in the train. It is evident that the rotational effects of the hypothetical case of operation outlined, may be obtained by holding the shaft 26 against rotation and rotating the housing 20 with the drum 10 at the normal operating speed of the drum. The housing and drum may be conveniently driven as by a suitable sprocket 38 mounted on the housing or on the shaft connecting the housing and the drum. An arm 40 may be secured to the shaft 26 to hold it against rotation, the free end of the arm being held between fixed portions 41 of the main frame 42 of the apparatus. If desired, there may be a frictional connection between the arm 40 and the shaft 26 so as to permit yielding of the shaft if excessive resistance to relative rotation between the auxiliary member 15 and the drum 10 is encountered. The arm 40 also affords a convenient means of calculating the power input required for the operation of the centrifuge, since the torque on the shaft 26 can easily be measured.

The gearing shown in Figure 1 is an example of various kinds of straight line reduction mechanisms which can be employed, such mechanisms being preferably balanced dynamically so as to avoid unnecessary gyration stresses on the main bearings. By way of example, another reduction gearing is illustrated in Figure 2. As shown, a spur pinion 45 is mounted on the shaft 26, this pinion meshing with two or more gears 46 carried by a rotatable cage 47. The gears 46 also mesh with a ring gear 48 mounted in the housing 50. Keyed to the cage 47 is a pinion 51 which is coaxial with the shaft 26. The pinion 51 meshes with one or more gears 52 which are carried by a cage 53 mounted on the shaft 25. The gears 52 also mesh with a ring gear 54 mounted within the casing 50. Thus, if the casing 50 is maintained stationary, rotation of the pinion 45 causes rotation of the gears 46 which mesh therewith. These gears thus walk around the ring gear 48 and revolve the cage 47 about the axis of the shaft 26. This in turn causes the rotation of the pinion 51 which meshes with the gears 52 so that the latter walk around the ring gear 54 and rotate the cage 53 and the shaft 25 at a considerably lower rate than the shaft 26. It is evident that various other reduction gear trains or equivalent devices can be employed in place of the ones illustrated and described.

Figure 1 illustrates additional auxiliary mechanism for the continuous operation of a centrifugal separator, such mechanism including a supply hopper 60 into which a mixture of liquid and solid material can be inserted for treatment in the drum 10. A feed screw 61 may be employed to feed this material into the interior of the drum where its further progress is brought about by the auxiliary member 15 which, in the apparatus illustrated in Figure 1, is a helical scraper adapted to push the solid material in the drum from the supply end to the discharge end. The feed screw 61 may be mounted on a shaft 62 driven by a sprocket wheel 63 connected by a suitable chain 64 to a sprocket wheel 65. This sprocket wheel is mounted on a shaft 66 which may be driven through sprocket wheels 67 and 68 connected by a chain 69, the sprocket wheel 68 being shown as mounted for rotation with the drum 10.

It is evident that many variations and modifications may be made in the particular embodiments of the invention herein shown and described without departing from the spirit or scope thereof as defined by the following claims.

I claim:

1. Mechanism for driving two coaxial rotatable members at different speeds, comprising a supporting frame directly connected to one of said members, a pair of coaxial shafts projecting from said frame in opposite directions, dynamically balanced speed-reducing mechanism carried by said frame and connecting said shafts for differential rotation whereby when the frame is stationary one of said shafts is a high-speed shaft and the other a low-speed shaft, said speed-reducing means including a plurality of auxiliary shafts parallel to said coaxial shafts, gear wheels mounted on said auxiliary shafts and a pinion mounted on said high-speed shaft meshing with said gear wheels, means for supporting said frame for rotation about the axis of said shafts, means for holding the high-speed shaft against rotation when the frame is rotated about the common axis, means directly connecting the low-speed shaft with the other said member, and means for rotating said frame.

2. Mechanism for driving two coaxial rotatable members at different speeds, comprising a casing directly connected to one of said members for rotation therewith, a pair of alined shafts in said casing and coaxial therewith, one of said shafts being a drive shaft directly connected to the other said member for rotation therewith, the other of said shafts being fixed, reduction gearing in said casing connecting said shafts and including a plurality of auxiliary shafts symmetrically distributed about the axis of rotation of said casing and parallel therewith, a gear wheel on said drive shaft, pinions on said auxiliary shafts meshing with the gear wheel, a fixed pinion mounted on said fixed shaft, and gear wheels on said auxiliary shaft meshing with said fixed pinion.

3. Mechanism for driving two coaxial rotatable members at different speeds, comprising a casing directly connected to one of said members for rotation therewith, a pair of alined shafts within said casing and coaxial therewith, one of said shafts being a drive shaft directly connected with the other said member, the other said shaft being a stationary shaft, means for frictionally holding said stationary shaft against rotation whereby said stationary shaft may rotate in response to excessive torque impressed thereon, and dynamically balanced reduction gearing mounted within said casing and connecting said two shafts.

ERIC G. PIPER.